United States Patent [15] 3,696,116
Jeanmart et al. [45] Oct. 3, 1972

[54] 1-(2-AMINOCARBONYLOXYETHYL)-5-NITRO-IMIDAZOLE DERIVATIVES HAVING ANTIPROTOZOAL ACTIVITY

[72] Inventors: Claude Jeanmart, Brunoy; Mayer Naoum Messer, Bievres, both of France

[73] Assignee: Rhone-Poulenc S.A., Paris, France

[22] Filed: July 15, 1970

[21] Appl. No.: 55,283

[30] Foreign Application Priority Data

July 18, 1969 France..................6924575

[52] U.S. Cl..................260/309, 424/273
[51] Int. Cl..................C07d 49/36
[58] Field of Search..................260/309

[56] References Cited

UNITED STATES PATENTS 3,505,349  4/1970  Beaman et al. ............260/309

FOREIGN PATENTS OR APPLICATIONS 1,153,346  5/1969  Great Britain............260/309

OTHER PUBLICATIONS

Cosar et al. Arzneimittel–Forschung Vol. 16, Pages 23–29 (1966). RS1.A8

Primary Examiner—Natalie Trousof
Attorney—Stevens, Davis, Miller & Mosher

[57] ABSTRACT

Imidazole derivatives of the formula:

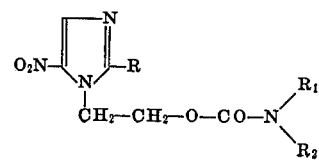

wherein R represents hydrogen or alkyl of one through four carbon atoms, $R_1$ represents hydrogen, alkyl of one through five carbon atoms, or hydroxy, and $R_2$ represents hydrogen or alkyl of one through five carbon atoms, possess anti-protozoal activity, especially against the pathogenic protozoa of amoebiasis and trichomoniasis.

7 Claims, No Drawings

1-(2-AMINOCARBONYLOXYETHYL)-5-NITROIMIDAZOLE DERIVATIVES HAVING ANTIPROTOZOAL ACTIVITY

This invention relates to new therapeutically useful imidazole derivatives, to a process for their preparation and pharmaceutical compositions containing them.

The new imidazole derivatives of the present invention are those of the general formula:

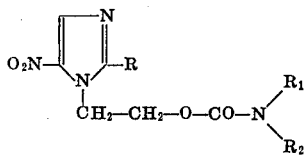

wherein R represents a hydrogen atom or an alkyl radical having one to four carbon atoms, $R_1$ represents a hydrogen atom, an alkyl radical having one to five carbon atoms, or a hydroxy group, and $R_2$ represents a hydrogen atom or an alkyl radical having one to five carbon atoms, the said alkyl radicals having straight- or branched-chains, and acid addition salts thereof.

According to a feature of the invention, the imidazole derivatives of general formula I are prepared by reaction of a compound of the general formula:

(wherein $R_1$ and $R_2$ are as hereinbefore defined) with an imidazole derivative of the general formula:

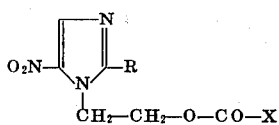

wherein X represents a halogen (preferably chlorine) atom or a phenoxy or benzyloxy radical, preferably phenoxy, and R is as hereinbefore defined.

The process is generally carried out in an inert solvent medium such as a hydrocarbon (e.g. benzene or toluene), a chlorinated hydrocarbon (e.g. chloroform or dichloroethane), an ether (e.g. diethyl ether, diisopropyl ether, tetrahydrofuran or dioxan), an amide (e.g. dimethylformamide) or a basic solvent (e.g. pyridine). In the case where X represents a phenoxy or benzyloxy radical, it is advantageous to use a straight- or branched-chain aliphatic alcohol having one to four carbon atoms, or even an aqueous medium, as the solvent.

The process is generally carried out at a temperature between 20°C. and the reflux temperature of the solvent employed.

In the case where X represents a halogen atom, the reaction can optionally be carried out in the presence of an acid-binding agent such as an inorganic base, for example the carbonate or bicarbonate of an alkali or alkaline earth metal, or in a basic solvent such as pyridine.

The compounds of general formula III wherein X represents a chlorine atom can be prepared in situ by reaction of phosgene with a 1-(2-hydroxyethyl)-5-nitroimidazole of the general formula:

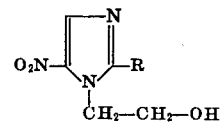

wherein R is as hereinbefore defined.

The compounds of general formula III wherein X represents a phenoxy or benzyloxy radical can be obtained by reaction of phenyl chloroformate or benzyl chloroformate with a 1-(2-hydroxyethyl)-5-nitroimidazole of general formula IV in the presence of a tertiary organic base, e.g. pyridine.

The 1-(2-hydroxyethyl)-5-nitroimidazoles of general formula IV can be prepared, for example, by reaction of ethylene oxide with a 5-nitroimidazole of the general formula:

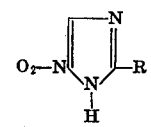

wherein R is as hereinbefore defined, in an organic acid medium, in accordance with the process described in British Patent Specification No. 992,168.

The imidazole derivatives of general formula I may be purified by physical methods such as distillation, crystallization or chromatography, or by chemical methods such as the formation of salts, crystallization of the salts and decomposition of them in an alkaline medium. In carrying out the said chemical methods the nature of the anion of the salt is immaterial, the only requirement being that the salt must be well-defined and readily crystallizable.

The imidazole derivatives of general formula I may be converted in manner known per se into acid addition salts. The acid addition salts can be obtained by the action of acids on the imidazole derivatives in appropriate solvents. As organic solvents there may be used alcohols, ethers, ketones or chlorinated hydrocarbons. The salt which is formed is precipitated, if necessary after concentration of its solution, and is separated by filtration or decantation.

The imidazole derivatives of the present invention, and their acid addition salts, possess interesting chemotherapeutic properties coupled with a low toxicity; in particular, they possess a very good antiprotozoal activity, especially against the pathogenic protozoa of ameobiasis and trichomoniasis. Preferred compounds of formula I are those wherein R represents an alkyl radical, preferably methyl, and in particular 1-(2-aminocarbonyloxyethyl)-2-methyl-5-nitroimidazole, 1-(2-methylaminocarbonyloxyethyl)-2-methyl-5-nitroimidazole, 1-(2-hydroxyaminocarbonyloxyethyl)-2-methyl-5-nitroimidazole and 1-(2-dimethylaminocarbonyloxyethyl)-2-methyl-5-nitroimidazole, and their acid addition salts.

A study of the sub-acute toxicity of the imidazole derivatives on oral administration to mice (one administration daily for 3 consecutive days) shows that the animals tolerate doses of 1,000 mg/kg animal body weight of active product ($LD_0$   1,000 mg/kg/p.o.).

The amoebicidal activity has been demonstrated in the oral treatment of hepatic amoebiasis of the hamster ($CD_{50}$ about 30 mg/kg/p.o. daily for 4 consecutive days).

The anti-trichomonas activity towards *Trichomonas vaginalis* has been demonstrated in vitro (minimum trichomonacidal concentration 5–10 µg/ml) and in vivo in mice ($CD_{50}$ between 5 and 20 mg/kg/p.o. daily for 5 consecutive days).

For therapeutic purposes, the imidazole derivatives of general formula I are employed as such or in the form of pharmaceutically acceptable non-toxic acid addition salts, i.e., salts containing anions which are relatively innocuous to the animal organism in therapeutic doses of the salts (such as hydrochlorides, sulphates, nitrates, phosphates, acetates, propionates, succinates, benzoates, fumarates, maleates, tartrates, theophyllineacetates, salicylates, phenolphthalinates and methylene-bis-β-hydroxynaphthoates) so that the beneficial properties inherent in the bases are not vitiated by side-effects ascribable to the anions.

The following examples illustrate the invention.

EXAMPLE 1

1-(2-Phenylcarbonyldioxyethyl)-2-methyl-5-nitroimidazole (17.5 g.) is heated with concentrated ammonia (d = 0.89; 60 cc.) for 15 minutes on a water-bath. The reaction mixture is cooled and poured onto ice-water (180 cc.); the mixture is stirred for 30 minutes at about 0°C. and the crystalline product is then filtered off, washed with water and dried in air. A product (12.6 g.) melting at 150°C. is thus obtained. This product is dissolved in boiling acetonitrile (40 cc.); decolorizing charcoal is added, the mixture is filtered hot and the filtrate is then cooled. A product (6.6 g.) melting at 151°–152°C. is thus obtained. A fresh recrystallization from acetonitrile (33 cc.) yields 1-(2-aminocarbonyloxyethyl)-2-methyl-5-nitromidazole (5.7 g.) melting at 151°–152°C.

1-(2-Phenylcarbonyldioxyethyl)-2-methyl-5-nitroimidazole employed as starting material is prepared by gradually adding phenyl chloroformate (40.7 g.) to a solution of 1-(2-hydroxyethyl)-2-methyl-5-nitroimidazole (42.5 g.) in anhydrous pyridine (375 cc.), while maintaining the temperature at about 6°–8° C. The mixture is then allowed to revert to ambient temperature in 2 hours 30 minutes, and the reaction mixture is poured into ice-water (1,500 cc.). A product crystallizes and is filtered off. The product (62.3 g.), melting at 102°–104°C., is recrystallized from a 1/1 by volume mixture of benzene-cyclohexane (300 cc.) to yield 1-(2-phenylcarbonyldioxyethyl)-2-methyl-5-nitroimidazole (55.9 g.) melting at 108°–109°C.

EXAMPLE 2

1-(2-Phenylcarbonyldioxyethyl)-2-methyl-5-nitroimidazole (21.8 g.) is heated with an 8N ethanolic solution of monomethylamine (37.5 cc.) for 30 minutes under reflux. The solution is then cooled to about 65°C., treated with diisopropyl ether (50 cc.) and cooled in an ice-bath. A product crystallizes and is filtered off, washed with ice-cold diisopropyl ether (3 × 20 cc.) and dried under reduced pressure. A product (11.9 g.) melting at 107°–109°C. is thus obtained. After a first recrystallization from ethyl acetate (20 cc.) the product (10.5 g.) melts at 108°–109°C. This product is dissolved in methylene chloride (100 cc.) and the resulting solution is chromatographed on a column (diameter 3 cm) containing silica for chromatography (50 g.). Elution is thereafter carried out with methylene chloride (1,700 cc.). Concentration of the eluate under reduced pressure (20 mm Hg) yields a crystalline product (10.3 g.) which is again recrystallized from a 1/1 by volume mixture of ethyl acetate-diisopropyl ether (160 cc.). 1-(2-Methylaminocarbonyloxyethyl)-2-methyl-5-nitromidazole (8.6 g.), melting at 110°C., is thus obtained.

EXAMPLE 3

1-(2-Phenylcarbonyldioxyethyl)-2-methyl-5-nitromidazole (40 g.) is added gradually at ambient temperature to a solution of hydroxylamine (13.2 g.) in methanol (400 cc.). A limpid solution is first obtained, and then crystals gradually appear and these are filtered off; a product (14.9 g.) melting at 178°C. is thus obtained. After two recrystallizations from methanol (210 cc. and 150 cc. respectively), 1-(2-hydroxyaminocarbonyloxyethyl)-2-methyl-5-nitromidazole (7.3 g.), melting at 180°C., is obtained.

EXAMPLE 4

A mixture of dimethylamine (15 g.) and 1-(2-phenylcarbonyldioxyethyl)-2-methyl-5-nitroimidazole (21.8 g.) in chloroform (53 cc.) is heated under reflux for 30 minutes. The residue obtained after concentration under reduced pressure (30 mm Hg) is taken up in diethyl ether (200 cc.); N hydrochloric acid (100 cc.) is added to the resulting solution with the temperature being kept below 10°C. The ether phase is separated off and is then washed with distilled water (2 × 50 cc.). 4N Sodium hydroxide solution (27.5 cc.) is added to the combined aqueous extracts without allowing the temperature to exceed 10°C. A product separates out and is extracted with methylene chloride (3 × 100 cc.). The combined methylene chloride extracts are dried over potassium carbonate and then concentrated under reduced pressure (30 mm Hg). The resulting syrupy residue (15 g.) is triturated with diisopropyl ether (50 cc.). A product crystallizes and is filtered off; the product (12.4 g.) melting at about 70°–72°C. is dissolved in methylene chloride (120 cc.). The resulting solution is chromatographed on a column (diameter 3 cm.) of silica for chromatography (60 g.).

Elution is carried out successively with methylene chloride (700 cc.) and then with ethyl acetate (750 cc.). Concentration of the eluates under reduced pressure (30 mm Hg) yields a crystalline residue (11.8 g.). Finally, recrystallization from diisopropyl ether (350 cc.) yields 1-(2-dimethylaminocarbonyloxyethyl)-2-methyl-5-nitroimidazole (9.7 g.) melting at 71°–72°C.

The present invention includes within its scope pharmaceutical compositions containing, as active ingredient, at least one of the imidazole derivatives of general formula I, or a non-toxic acid addition salt thereof, in association with a pharmaceutical carrier or coating. The invention includes especially such preparations made up for oral, rectal or parenteral administration, or local application.

Solid compositions for oral administration include tablets, pills, powders, and granules. In such solid compositions the active compound is admixed with at least one inert diluent such as sucrose, lactose or starch. The compositions may also comprise, as is normal practice, additional substances other than inert diluents, e.g., lubricating agents, such as magnesium stearate. LIquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavoring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions or emulsions. Examples of non-aqueous solvents or vehicles are propylene glycol, polyethylene glycol, vegetable oils, such as olive oil, and injectable organic esters such as ethyl oleate. These compositions may also contain adjuvants such as preserving, wetting, emulsifying and dispersing agents. They may be sterilized by, for example, filtration through a bacteria-retaining filter, by incorporation in the compositions of sterilizing agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suitable wax base.

Compositions for local application can be in various forms; the most extensively used forms are vaginal tablets or ovules which can also contain, in addition to the active product(s), inert diluents similar to those contained in the compositions for oral administration, or substance which enable better diffusion of the medicament in situ, such as sodium bicarbonate.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions when administered orally to an adult for the treatment of hepatic and intestinal amoebiasis and trichomoniases should generally give doses between 0.25 g. and 3 g. of active substance per day or when administered vaginally for the treatment of *Trichomonas vaginalis* between 0.25 g. and 1 g. per day.

The following example illustrates pharmaceutical compositions according to the invention.

EXAMPLE 5

Tablets containing 100 mg. of active product and having the following composition are prepared in accordance with the usual technique:

| | |
|---|---|
| 1-(2-aminocarbonyloxyethyl)-2-methyl-5-nitroimidazole | 0.100 g. |
| wheat starch | 0.090 g. |
| colloidal silica | 0.008 g. |
| magnesium stearate | 0.002 g. |

These tablets can be used in human therapy by oral administration, for example at the rate of 3 to 5 tablets daily for an adult.

WE CLAIM:

1. An imidazole derivative of the formula:

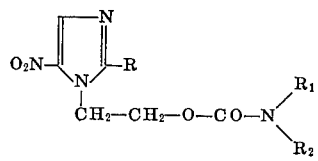

wherein R represents hydrogen or alkyl of one through four carbon atoms, $R_1$ represents hydrogen, alkyl of one through five carbon atoms, or hydroxy, and $R_2$ represents hydrogen or alkyl of one through five carbon atoms, or a pharmaceutically acceptable non-toxic acid addition salt thereof.

2. An imidazole derivative according to claim 1 wherein R represents alkyl of one through four carbon atoms.

3. An imidazole derivative according to claim 1 wherein R represents methyl.

4. The imidazole derivative according to claim 1 which is 1-(2-aminocarbonyloxyethyl)-2-methyl-5-nitroimidazole or a pharmaceutically acceptable non-toxic acid addition salt thereof.

5. The imidazole derivative according to claim 1 which is 1-(2-methylaminocarbonyloxyethyl)-2-methyl-5-nitroimidazole or a pharmaceutically acceptable non-toxic acid addition salt thereof.

6. The imidazole derivative according to claim 1 which is 1-(2-hydroxyaminocarbonyloxyethyl)-2-methyl-5-nitroimidazole or a pharmaceutically acceptable non-toxic acid addition salt thereof.

7. The imidazole derivative according to claim 1 which is 1-(2-dimethylaminocarbonyloxyethyl)-2-methyl-5-nitromidazole or a pharmaceutically acceptable non-toxic acid addition salt thereof.

* * * * *